July 26, 1955    A. A. LIMBERG ET AL    2,714,035
RETRACTABLE AUTOMOBILE BACK WINDOW
Filed Sept. 26, 1952    3 Sheets-Sheet 1
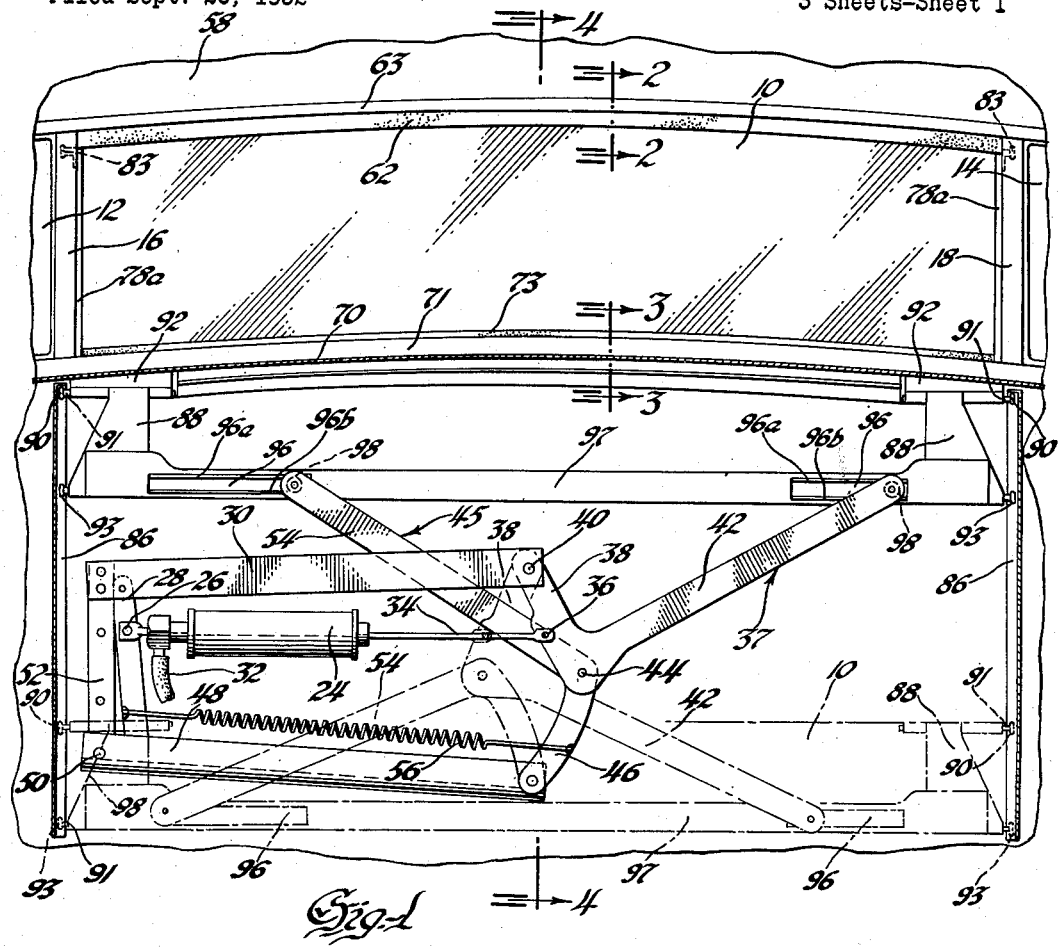
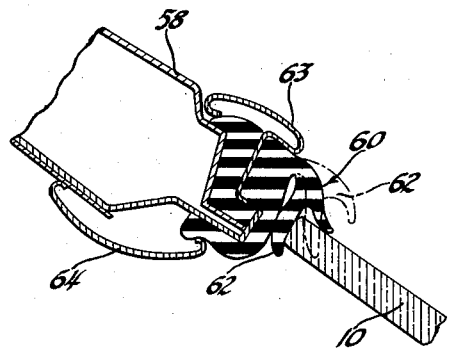
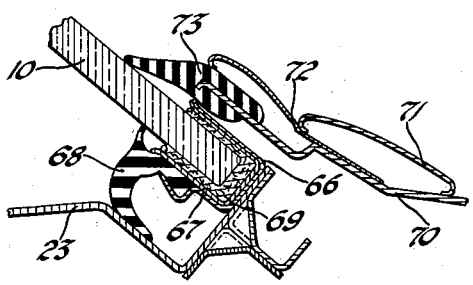
Inventors
Alfons A. Limberg &
Thomas Roberton
By
Willits, Helwig & Caillie
Attorneys

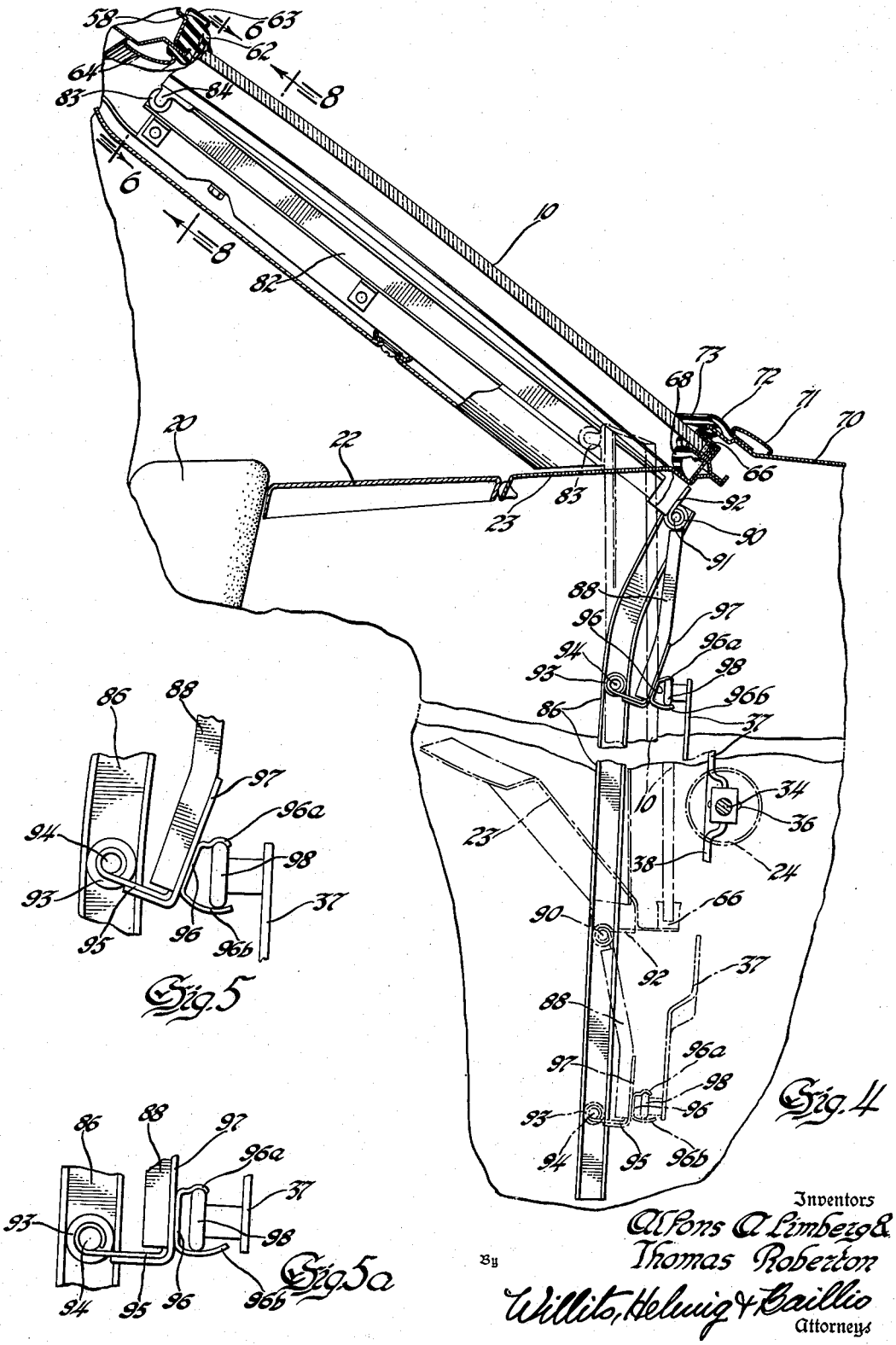

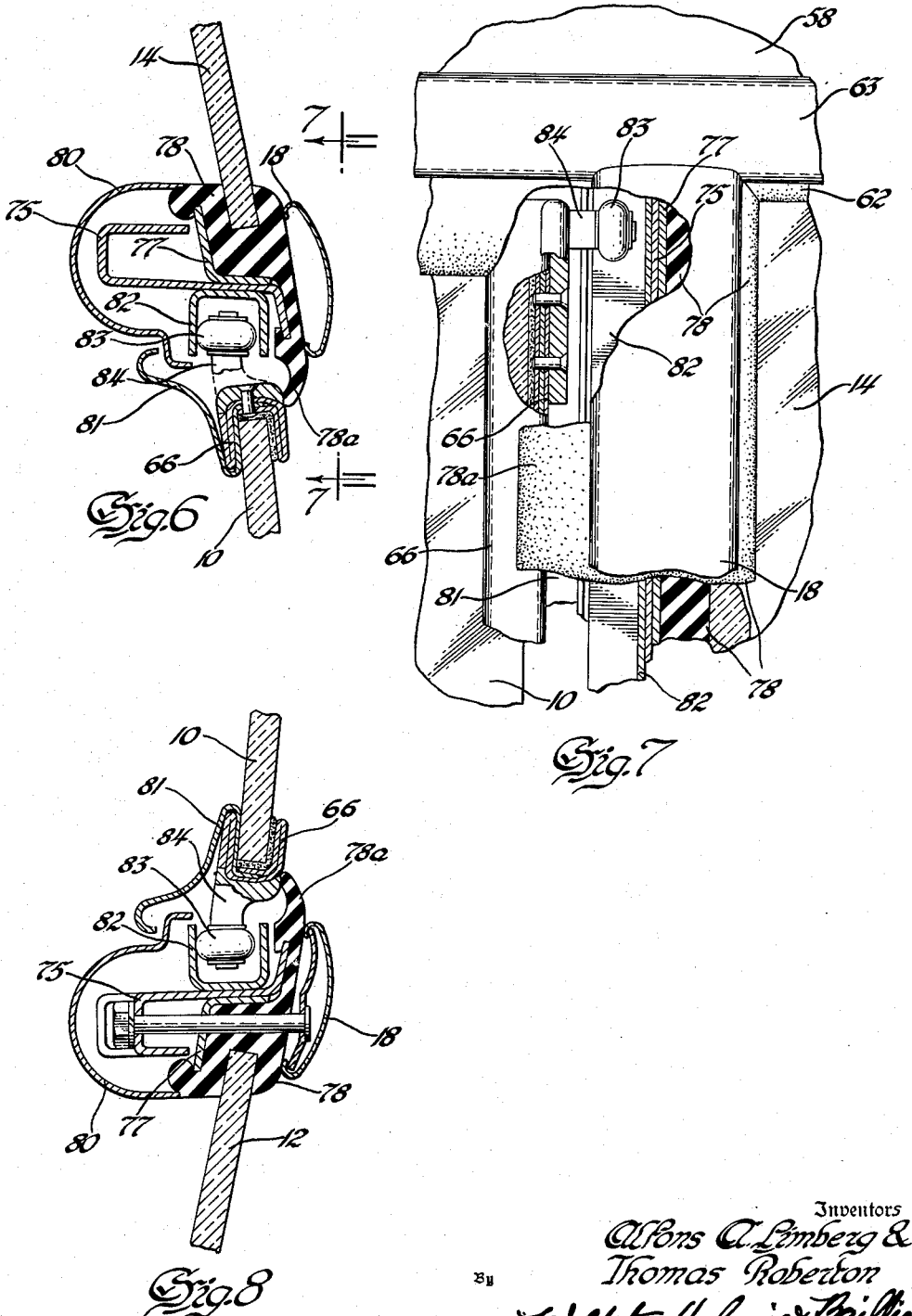

United States Patent Office 2,714,035
Patented July 26, 1955

2,714,035

RETRACTABLE AUTOMOBILE BACK WINDOW

Alfons A. Limberg and Thomas Roberton, Grosse Pointe, Mich., assignors to General Motors Corporation, Detroit, Mich., a corporation of Delaware Application September 26, 1952, Serial No. 311,712

16 Claims. (Cl. 296—44)

This invention relates to a retractable window, and more particularly to a retractable rear window for an automobile.

In most hard top automobiles the rear window is fixed in closed position and cannot be opened. The invention provides an improved window of this type which may be moved between closed position and an open or retracted position, and which is operated by power means, as, for example, a fluid actuated piston and cylinder device. When the window is closed it lies in a plane which is oblique to a vertical plane, since the back of modern automobiles slopes forwardly. In order to open the window it must be moved down below the package shelf in back of the rear seat of the automobile, and, of course, during this movement it must move into a different plane, assuming a substantially vertical position. If the window is to be properly sealed when it is closed no portion of the window can pass outside the sealing means as the window is moved from its closed position to its retracted position. A sealing lip engages the window panel adjacent the edges thereof when the window is closed, and if this sealing lip were placed so close to the edges of the panel that the panel could pass by and outside the lip during movement of the window a good seal would not be provided when the window is closed.

In the illustrated embodiment of the invention the window is moved between closed and retracted positions by operating means comprising a hydraulic device having a pair of scissors type arms which are connected to the window panel. These arms move in a given plane, i. e., a substantially vertical plane as illustrated. However, as noted above, the window moves from a plane which is oblique with reference to the vertical into a substantially vertical plane as it is retracted, and the window panel cannot pass outside the sealing lip during this movement. The present invention includes a novel connecting means to provide for movement of the panel in directions angular to the given plane in which the scissor arms move upon movement of the arms in said given plane, and the window is wedged into engagement with the sealing lip upon movement into closed position.

Other features and advantages of the invention will be apparent from the following description and from the drawings, in which:

Fig. 1 is a fragmentary transverse vertical section through an automobile taken immediately rearwardly of the rear window of the automobile, looking forwardly, parts being shown in solid lines in one position and in broken lines in another position;

Fig. 2 is an enlarged detail section through the top of the window taken along the line 2—2 of Fig. 1;

Fig. 3 is an enlarged detail section through the bottom of the window taken along the line 3—3 of Fig. 1;

Fig. 4 is a vertical longitudinal section taken along the line 4—4 of Fig. 1;

Fig. 5 is a fragmentary enlarged view of a portion of the apparatus of Fig. 4, the parts being shown in the upper or closed position;

Fig. 5a is a view similar to Fig. 5, but with the parts in lower or open position;

Fig. 6 is an enlarged fragmentary section taken along the line 6—6 of Fig. 4;

Fig. 7 is an elevational view, with parts cut away, taken at right angles to Fig. 6, along the line 7—7 of Fig. 6 and Fig. 8 is an enlarged fragmentary section taken along the line 8—8 of Fig. 4.

Referring now more particularly to the drawings, 10 is the main panel of the rear window of an automobile, the panel 10 being flanked at its opposite sides by subsidiary panels 12 and 14. The panels 10, 12 and 14 are separated by division posts having thereon trim strips 16 and 18. As shown in Fig. 4, the panel 10 is curved, extending further rearwardly of the automobile at the center of the automobile than at the sides thereof.

As shown in Fig. 4 in solid lines the window 10, when closed, extends obliquely over the rear seat back 20, a package shelf 22, and a closure panel 23 forming an extension of the package shelf. The window is movable from this closed position to a retracted position (shown fragmentarily in broken lines in Figs. 1 and 4) where it is housed substantially entirely beneath the package shelf 22. The operating means for moving the window shown in Fig. 1 comprises a hydraulic device having a piston (not shown) in a cylinder 24 which is pivotally mounted at 26 on a mounting bar 28 depending from a fixed anchor bar 30. The cylinder 24 is connected to a source of fluid by means of a hose 32, and conventional fluid supply means and valve means (not shown) may be provided for moving the piston in the cylinder. A piston rod 34 projects from the cylinder and is pivotally connected at 36 to an L-shaped arm designated generally as 37 having a relatively short portion 38 which is pivoted at 40 to the end of the fixed anchor bar 30. A relatively long portion 42 of the arm 37 carries one side of the window panel 10, as will hereafter appear.

At a point 44 intermediate portions 38 and 42 the arm 37 is pivotally connected to another L-shaped arm designated generally as 45 and having a relatively short portion 46 which is pivoted on one end of a bar 48, said bar being pivoted at its other end at 50 on a frame member 52 which supports the fixed anchor bar 30. The L-shaped arm 45 also has a relatively long portion 54 which carries the other side of the window panel 10.

When fluid supplied through tube 32 drives the piston to the outer end of the cylinder 24 the arms 37 and 45 are in the position shown in solid lines wherein the window panel 10 is held in its closed position.

When fluid pressure in the cylinder 24 is released, a spring 56, which is connected between the arm 46 and the bar 28, causes the arms 37 and 45 to swing in a generally vertical plane to the position illustrated in broken lines in Fig. 1, whereby the window panel 10 is moved to its retracted position. It will be noted that the arms 37 and 45 move in a given plane, i. e., a generally vertical plane in the apparatus as illustrated. However, the window panel 10 must move from closed position, where it lies in a plane oblique to the vertical, to a retracted position in a generally vertical plane as illustrated, and during this movement no portion of the panel 10 can pass outside of the sealing means if a proper seal is to be provided when the window is in its closed position.

Figs. 2 and 4 show in detail the sealing means for the upper edge of the window panel 10. The roof 58 of the automobile has mounted on its edge a rubber sealing member designated generally as 60 and having a flange portion 62 which is engaged by the upper edge of the glass panel 10 and is deformed into sealing engagement with the panel when the window is closed as shown in Fig. 2. An exterior trim strip 63 and an interior trim strip 64 are provided in conventional manner.

Figs. 3 and 4 show in detail the sealing means for the lower edge of the window panel. The lower edge of the panel 10 is carried in a channel member having an outer portion 66 and inner portion 67, a rubber sealing member 68 being clamped between the channel portions 66 and 67. A gasket 69 is mounted between the edge of the glass 10 and the metal channel. The deck panel 70 of the automobile has mounted thereon a trim strip 71 and a clamping strip 72, and a rubber seal member 73 is clamped between the edge of the deck panel 70 and the clamping strip 72.

The sealing structure at the sides of panel 10 is shown best in Fig. 8. Each of the division posts between the main panel 10 and the subsidiary panels 12 and 14 has an internal frame 75 which has welded thereto a supporting bracket 77, this bracket carrying a rubber sealing strip 78 which is in fixed sealing engagement with the respective subsidiary panels 12 and 14, and is in movable sealing engagement with the metal channel 66 on the main window panel 10 by means of a deformable flange or lip 78a. Interior trim strips 80 and 81 are provided as shown in Figs. 6 and 8, the strip 81 providing a drain trough inside the car to catch any water that might leak past the window.

In the following description of the means for connecting the movable window panel 10 to the operating arms 37 and 45 similar parts are found at opposite sides of the window panel 10, and in order to simplify the description the parts at only one side of the panel will be described, and similar parts at the opposite side will be designated by like reference characters.

Track members 82 are carried by the respective division post frame members 75 and extend generally parallel to the oblique plane in which the window panel 10 lies when in closed position. Rollers 83 are carried on posts 84 projecting from the channel window frame 66, the rollers 83 engaging the respective tracks 82 to provide for substantially straight line movement of the upper edge of the window panel 10 between the solid line position and the dotted line position shown in Fig. 4.

Guide channels 86 (Figs. 1 and 4) on opposite sides of the panel 10 extend downwardly below the level of the package shelf extension 23. As shown in Fig. 4, these guide channels have a lower straight portion extending generally parallel to the plane in which the arms 37 and 45 move and an upper curved portion diverging from said plane to provide a curved path of movement for the lower edge of the window panel 10. Brackets 88 are movable along the respective guide channels 86, each bracket mounting a roller 90 adjacent its upper edge. As shown in Figs. 1 and 4, each roller 90 is carried on a shaft 91 which is rotatably journalled in a bore formed by spaced rolled edge portions of a hinge member 92 which is secured to and projects at a right angle from the lower edge of the window panel 10. The upper edge of each bracket 88 is rolled about the shaft 91 between the spaced edge portions of the hinge member 92 to complete the hinge and form a pivotal connection between brackets 88 and the lower edge of the window panel 10.

At its lower edge each bracket 88 carries a roller 93, shaft 94 which carries this roller being mounted on a flange 95 projecting from the lower edge bracket 88 (Figs. 4 and 5).

As best seen in Fig. 4, during movement of the window from its closed position to its retracted position the upper roller 90 engages both the straight and curved portions of the track 86, while the lower roller 93 engages only the straight portion of said track and therefore the lower roller moves only in one plane. However, the bracket 88 tilts as it is moved between its lower position and its upper position, as shown clearly in Fig. 4, and therefore the connection between the lower edge of the bracket and the one of the operating arms 37 and 45 to which said bracket is connected must accommodate the tilting. To provide this connection, track members 96 are carried on a connecting bar 97 which extends between the brackets 88. The arms 37 and 45 carry rollers 98 which engage the tracks 96. In order to accommodate the tilting action of the brackets 88, the upper side 96a of each track 96 is shaped so that it provides a pivot for the upper side of the associated roller 98, this construction being best shown in Figs. 4 and 5 wherein the upper side 96a of the track 96 is seen to be arcuate and to have a radius generally the same as the radius of the rolling surface of the roller 98. The lower side 96b of each track 96 is so shaped that it provides a sliding surface for the lower side of the associated roller 98, the lower side 96b of each track 96 being formed on an arc having its radius at the center of the upper side 96a of the track.

Figs. 1, 4 and 5 show how the lower side of the rollers 98 slide along the track surface 96a to permit tilting of the brackets 88 so that the window panel 10 may move between its closed and retracted positions upon movement of the arms 37 and 45 in a given plane. This construction permits the window to move between its two positions without having any portion of the window panel move outside the sealing means provided by the deformable rubber lips as above described, and, at the same time, the window panel is wedged into sealing position by the last portion of its movement to closed position.

While we have shown and described one embodiment of our invention, it is capable of many modifications. Changes therefore, in the construction and arrangement may be made without departing from the spirit and scope of the invention as set forth in the appended claims.

What is claimed is:

1. Apparatus of the character described, including: a closure panel; operating means movable in a given plane for moving said panel between two positions; guide means having a straight part extending generally parallel to said plane and a curved part angular to said plane and providing a curved path of movement for said panel; and means interconnecting said panel and said operating means and having a portion engageable with only the straight part of said guide means and a portion engageable with the curved part thereof to provide for movement of said panel in directions angular to said given plane upon movement of said operating means in said plane.

2. Apparatus of the character described, including: a closure panel; operating means movable in a given plane for moving said panel between two positions; guide means having a straight part extending generally parallel to said plane and a curved part angular to said plane and providing a curved path of movement for said panel; a bracket movable along said guide means and having a first portion engageable with only the straight part of said guide means and a second portion engageable with the curved part thereof; means connecting the first portion of said bracket to said operating means; and means connecting the second portion of said bracket to said panel, said bracket and connecting means providing for movement of said panel in directions angular to said given plane upon movement of said operating means in said plane.

3. Apparatus of the character described, including: a closure panel; operating means movable in a given plane for moving said panel between two positions; a guide channel having a straight part extending generally parallel to said plane and a curved part angular to said plane and providing a curved path of movement for said panel; a bracket movable along said guide channel and having a first roller engageable with only the straight part of said guide channel and a second roller engageable with both the straight and the curved parts of said guide channel; means connecting said bracket adjacent said first roller to the operating means; and means connecting said bracket adjacent said second roller to the panel, said bracket and connecting means providing for movement of said panel in directions angular to said given plane upon movement of said operating means in said plane.

4. Apparatus of the character described, including: a closure panel; operating means movable in a given plane for moving said panel from an operative position to a retracted position; first guide means providing a path of movement for one edge of said panel; means connecting said edge of the panel to the guide means; second guide means having a straight part extending generally parallel to said plane and a curved part angular to said plane and providing a curved path of movement for another edge of said panel; a bracket movable along said second guide means and having a first portion engageable with only the straight part of said second guide means and a second portion engageable with the curved part thereof; means connecting the first portion of said bracket to said operating means; and means connecting the second portion of said bracket to said other edge of the panel, said bracket and connecting means providing for movement of the last mentioned edge of said panel in directions angular to said given plane upon movement of said operating means in said plane.

5. Apparatus of the character described, including: a closure panel; operating means movable in a given plane for moving said panel from an operative position to a retracted position; first guide means providing a path of movement for one edge of said panel; means connecting said edge of the panel to the guide means; a guide channel having a straight part extending generally parallel to said plane and a curved part angular to said plane and providing a curved path of movement for said panel; a bracket movable along said guide channel and having a first roller engageable with only the straight part of said guide channel and a second roller engageable with both the straight and the curved parts of said guide channel; means connecting said bracket adjacent said first roller to the operating means; and means connecting said bracket adjacent said second roller to the opposite edge of said panel, said bracket and connecting means providing for movement of said opposite edge of the panel in directions angular to said given plane upon movement of said operating means in said plane.

6. Apparatus of the character described, including: a closure panel; operating means movable in a given plane for moving said panel between two positions; guide means having a straight part extending generally parallel to said plane and a curved part angular to said plane and providing a curved path of movement for said panel; a bracket movable along said guide means and having a first portion engageable with only the straight part of said guide means and a second portion engageable with the curved part thereof; means providing a connection movable in two planes between the first portion of said bracket and said operating means; and means pivotally connecting the second portion of said bracket to said panel, said bracket and connecting means providing for movement of said panel in directions angular to said given plane upon movement of said operating means in said plane.

7. Apparatus of the character described, including: a closure panel; operating means movable in a given plane for moving said panel between two positions; guide means having a straight part extending generally parallel to said plane and a curved part angular to said plane and providing a curved path of movement for said panel; a bracket movable along said guide means and having a first portion engageable with only the straight part of said guide means and a second portion engageable with the curved part thereof; a track member mounted on said bracket adjacent the first portion thereof and extending transversely to the straight portion of said guide means; a rotatable member mounted on said operating means and engaging said track for movement therealong; and means connecting the second portion of said bracket to said panel, said bracket and connecting means providing for movement of said panel in directions angular to said given plane upon movement of said operating means in said plane.

8. Apparatus of the character claimed in claim 7, wherein one side of said track is so shaped that it provides a pivot for one side of said rotatable member about an axis transverse to the axis of rotation thereof, and wherein the opposite side of said track is so shaped that it provides a sliding surface for the opposite side of said rotatable member about said axis of pivotal movement.

9. Apparatus of the character described, including: a closure panel; operating means movable in a given plane for moving said panel between two positions; a guide channel having a straight part extending generally parallel to said plane and a curved part angular to said plane and providing a curved path of movement for said panel; a bracket movable along said guide channel and having a first roller engageable with only the straight part of said guide channel and a second roller engageable with both the straight and the curved parts of said guide channel; a track member mounted on said bracket adjacent said first roller and extending transversely of the straight portion of said guide channel; a rotatable member mounted on said operating means and engaging said track for movement therealong, one side of said track being so shaped that it provides a pivot for one side of said rotatable member about an axis transverse to the axis of rotation thereof, and the opposite side of said track being so shaped that it provides a sliding surface for the opposite side of said rotatable member about said axis of pivotal movement; and means connecting said bracket adjacent said second roller to the panel, said bracket and connecting means providing for movement of said panel in directions angular to said given plane upon movement of said operating means in said plane.

10. Apparatus of the character described, including: a closure panel; operating means movable in a given plane for moving said panel from an operative position to a retracted position; first guide means providing a path of movement for one edge of said panel; means connecting said edge of the panel to said guide means; second guide means having a straight part extending generally parallel to said plane and a curved part angular to said plane and providing a curved path of movement for another edge of said panel; a bracket movable along said second guide means and having a first portion engageable with only the straight part of said second guide means and a second portion engageable with the curved part thereof; a track member mounted on said bracket adjacent said first portion and extending transversely of the straight portion of said second guide means; a rotatable member mounted on said operating means and engaging said track for movement therealong, one side of said track being so shaped that it provides a pivot for one side of said rotatable member about an axis transverse to the axis of rotation thereof, and the opposite side of said track being so shaped that it provides a sliding surface for the opposite side of said rotatable member about said axis of pivotal movement; and means connecting the second portion of said bracket to said other edge of the panel, said bracket and connecting means providing for movement of the last mentioned edge of said panel in directions angular to said given plane upon movement of said operating means in said plane.

11. Apparatus of the character described, including: a closure panel; operating means movable in a given plane for moving said panel from an operative position to a retracted position; first guide means providing a path of movement for one edge of said panel; means connecting said edge of the panel to the guide means; a guide channel having a straight part extending generally parallel to said plane and a curved part angular to said plane and providing a curved path of movement for said panel; a bracket movable along said guide channel and having a first roller engageable with only the straight part of said guide channel and a second roller engageable with both the straight and the curved parts of said guide channel; a track member mounted on said bracket adjacent said first roller and extending transversely of the straight portion of said guide channel; a rotatable member mounted on said operating means and engaging said track for movement therealong, one side of said track being so shaped that it provides a pivot for one side of said rotatable member about an axis transverse to the axis of rotation thereof, and the opposite side of said track being so shaped that it provides a sliding surface for the opposite side of said rotatable member about said axis of pivotal movement; and means pivotally connecting said bracket adjacent said second roller to the opposite edge of said panel, said bracket and connecting means providing for movement of said opposite edge of the panel in directions angular to said given plane upon movement of said operating means in said plane.

12. A retractable window of the character described, including: a window panel movable between a closed position in a first plane and a retracted position in a second plane angular to said first plane; operating means having arms for moving the window, said arms being movable in a plane generally parallel to said second plane; guide means having a straight part extending generally parallel to said second plane and a curved part angular to said second plane and providing a curved path of movement for said panel; and means interconnecting said panel and said arms and having a portion engageable with only the straight part of said guide means and a portion engageable with the curved part thereof to provide for movement of said panel between said two positions upon movement of said arms in said second plane.

13. A retractable window of the character described, including: a window panel movable between a closed position in a first plane and a retracted position in a second plane angular to said first plane; operating means having arms for moving the window, said arms being movable in a plane generally parallel to said second plane; guide means on opposite sides of said panel extending generally parallel to said first plane and providing a path of movement for the upper end of said panel; means connecting said end of the panel to said guide means; guide channels on opposite sides of said panel, each having a straight part extending generally parallel to said second plane and a curved part angular thereto and providing a curved path of movement for the lower end of said panel; brackets movable along said guide channels and each having a first roller engageable with only the straight part of a guide channel and a second roller engageable with both the straight and the curved parts thereof; means connecting each bracket adjacent said first roller to one of said arms; and means connecting each bracket adjacent said second roller to the lower end of the panel, said bracket and connecting means providing for movement of said panel between said two positions upon movement of said arms in said second plane.

14. A retractable window of the character described, including: a window panel movable between a closed position in a first plane and a retracted position in a second plane angular to said first plane; operating means having arms for moving the window, said arms being movable in a plane generally parallel to said second plane; guide means on opposite sides of said panel extending generally parallel to said first plane and providing a path of movement for the upper end of said panel; means connecting said end of the panel to said guide means; guide channels on opposite sides of said panel, each having a straight part extending generally parallel to said second plane and a curved part angular thereto and providing a curved path of movement for the lower edge of said panel; brackets movable along said guide channels and each having a first roller engageable with only the straight part of a guide channel and a second roller engageable with both the straight and the curved parts thereof; a track member mounted on each bracket adjacent the lower edge thereof and extending transversely of the straight portion of said guide channel; a rotatable member mounted on each arm and engaging the respective tracks for movement therealong, the upper side of each track being so shaped that it provides a pivot for the upper side of the associated rotatable member about an axis transverse to the axis of rotation thereof, and the lower side of each track being so shaped that it provides a sliding surface for the lower side of said rotatable member about said axis of pivotal movement; and means connecting said bracket adjacent the upper edge thereof to the lower end of the panel, said brackets and connecting means providing for movement of said panel between said two positions upon movement of said arms in said second plane.

15. Apparatus of the character described, including: a window panel; operating means movable in a given plane for moving said panel between two positions; guide means along which said window moves in a curved path angular to said plane between said two positions; and means interconnecting said panel and said operating means and having portions engageable with different parts of said guide means to provide for movement of said panel in said curved path.

16. Apparatus of the character described, including: a window panel; operating means movable in a given plane for moving said panel between two positions; guide means along which said window moves in a curved path angular to said plane between said two positions, said guide means having a straight part and a curved part; and means interconnecting said panel and said operating means and having a portion engageable with only the straight part of said guide means and a portion engageable with the curved part thereof to provide for movement of said panel in said curved path.

References Cited in the file of this patent

UNITED STATES PATENTS

| | | |
|---|---|---|
| 1,907,799 | Hardtke | May 9, 1933 |
| 1,935,468 | Dittus | Nov. 14, 1933 |
| 2,371,183 | Parsons | Mar. 13, 1945 |
| 2,398,852 | Parsons | Apr. 23, 1946 |
| 2,478,523 | Cadwallader | Aug. 9, 1949 |

FOREIGN PATENTS

| | | |
|---|---|---|
| 575,257 | France | Apr. 18, 1924 |
| 581,581 | France | Sept. 29, 1924 |
| 602,276 | Germany | Feb. 10, 1932 |